United States Patent
Midgett

(10) Patent No.: US 6,199,503 B1
(45) Date of Patent: Mar. 13, 2001

(54) BOAT TRAILER GUIDE

(76) Inventor: Peter J. Midgett, 348 Toulon Dr., Wilmington, NC (US) 28405

( * ) Notice: Subject to any disclaimer, the term of this patent is extended or adjusted under 35 U.S.C. 154(b) by 0 days.

(21) Appl. No.: 09/212,801

(22) Filed: Dec. 16, 1998

(51) Int. Cl.$^7$ ................................................. B60P 3/10
(52) U.S. Cl. ..................... 116/28 R; 116/228; 116/215; 280/477
(58) Field of Search ................... 116/28 R, 209, 116/227, 228, 229, 173, 215, 35 R, 284, 303; 33/264, 286; 280/414.1, 414.2, 477, 762; 114/344; 73/309, 317, 322.5; 340/431, 436

(56) References Cited

U.S. PATENT DOCUMENTS

| | | | |
|---|---|---|---|
| 2,097,278 | * 10/1937 | Hastings | 73/317 |
| 3,064,617 | 11/1962 | Meagher | 116/28 R |
| 3,760,441 | * 9/1973 | Handelman | 441/11 |
| 3,863,594 | 2/1975 | Gawthrop | 116/28 R |
| 3,995,251 | * 11/1976 | Jones | 340/431 |
| 4,091,442 | * 5/1978 | Markey | 362/485 |
| 4,553,897 | * 11/1985 | Briggs | 414/559 |
| 4,574,631 | * 3/1986 | Johnson, Jr. | 73/317 |
| 4,940,251 | 7/1990 | Willmsen | 280/414.1 |
| 4,958,436 | 9/1990 | Tusche | 33/264 |
| 5,035,441 | 7/1991 | Murray | 280/477 |
| 5,117,693 | * 6/1992 | Duksa | 73/317 |
| 5,375,467 | * 12/1994 | Banse | 70/290 R |
| 5,596,944 | 1/1997 | Massie | 116/28 R |
| 5,755,453 | * 5/1998 | Bell | 280/477 |
| 6,062,160 | * 5/2000 | Delcambre | 116/28 R |

* cited by examiner

*Primary Examiner*—Andrew H. Hirshfeld
*Assistant Examiner*—R. Alexander Smith
(74) *Attorney, Agent, or Firm*—Rhodes & Mason, PLLC

(57) ABSTRACT

A guide device for attachment adjacent the rear of a boat trailer to assist the driver of a towing vehicle in backing the unloaded trailer into the water. The guide device includes a mounting bracket for attaching the device onto a rear part of the boat, such as onto the front face of the rear lateral frame member, and a signal member mounted on the bracket and pivotal between raised and lowered positions. The signal member includes an elongated staff above the bracket and a flotation element attached to the lower end of the staff beneath the bracket. The flotation element is lighter than water, and has a weight greater than the weight of said staff. When the trailer is out of the water, the staff is pivoted by the weight of the flotation element to a generally vertical position. When the rear of the trailer is backed into the water, the flotation element rises to pivot the staff to a generally horizontal position.

19 Claims, 2 Drawing Sheets

BOAT TRAILER GUIDE

BACKGROUND OF THE INVENTION

(1) Field of the Invention

The present invention relates generally to a guide to assist the operator of a vehicle in tracking the position of an attached, unloaded, boat trailer when the trailer is being backed in to the water, and in particular to a guide that will automatically assume an upright position when the trailer is out of the water, but which will be automatically lowered when the trailer is backed into the water, preventing damage to the guide when a boat is loaded onto the trailer.

(2) Description of the Prior Art

Numerous prior art devices have been proposed to assist the driver of a towing vehicle in ascertaining the position of an attached, empty boat trailer. For example, U.S. Pat. No. 5,596,944 to Massie describes a guide device comprised of a mounting bracket for attaching the device to a boat trailer, and an elongated signal rod or staff that is pivotally attached to the bracket. The signal rod has a weighted lower end, urging the rod to the vertical position. When the trailer is empty, the rod rotates to the vertical position. Contact of the rod with a boat loaded onto the trailer forces the rod to a horizontal position beneath the boat.

Another guide device, described in U.S. Pat. No. 4,940,251 to Willmsen, uses a water scoop at the lower end of the rod to scoop water when the boat is backed into the water. Thus, as with the Massie device, the rod is in an upright position when the trailer is empty, whether the trailer is in or out of the water, and is forced to a horizontal position when the trailer is loaded.

U.S. Pat. No. 4,958,436 to Tusche describes a trailer hitch guide comprised of a plurality of signal flags attached to the boat trailer with springs, so that the flags are normally in an upright position. When the trailer is loaded, the boat forces the flags to a horizontal position beneath the boat.

U.S. Pat. No. 3,863,594 to Gawthorp describes a similar structure, except that the flags are manually moved to the desired position. The flags are attached to the trailer in positions such that the flags do not contact or otherwise interfere with loading or unloading the boat.

One of the major difficulties with these prior art devices, with the exception of the Gawthorp device, is the fact that they rub against the boat hull during loading and unloading, potentially damaging or even breaking the device. Gawthorp recognizes this problem, but requires manual movement of the device between raised and lowered positions, which can be inconvenient when the driver is alone, especially if the boat trailer is in the water.

Thus, there is a continuing need for a boat trailer guide device that will assist the driver of a towed vehicle in determining the position of an empty boat trailer, especially when the trailer is being backed into the water. There is especially a need for a device that will automatically assume a raised, visual position when the unloaded trailer is out of the water, and a lowered, protected position when the trailer is in the water.

SUMMARY OF THE INVENTION

The present invention is based upon the recognition that the only time it is necessary to see the trailer guide is when the trailer is out of the water. Once the trailer is in the water, the objective has been achieved. Therefore, the present invention is directed to a boat trailer guide that automatically assumes an upright position when the empty boat trailer is out of the water, and a lowered position when the empty trailer is in the water.

As a result of this construction, the guide is in a lowered or horizontal position when the boat is unloaded or loaded. The guide is positioned so that all of its elements are at a level below the path of the boat. Therefore, the risk of damage or breakage of the guide is eliminated without requiring manual lowering of the device.

The boat trailer guide of the present invention is adapted to be attached to the frame of a boat trailer. Normally, these trailers will be comprised of a metal frame that includes spaced longitudinal frame members joined by lateral frame members, with one of the lateral frame members being located adjacent the rear of the trailer. The trailer is supported on a wheeled axle, and usually includes a pair of spaced longitudinal support skids upon which the boat rests, and a plurality of grooved rollers to facilitate loading and unloading, and also support the boat. A hitch, such as a ball hitch, is mounted at the front of the trailer for attachment to a towing vehicle.

Generally, the boat trailer guide is comprised of a mounting bracket and an elongated signal member pivotally attached to the bracket, so that the signal member is pivotal between raised and lowered positions. The device is designed and mounted so that the guide, when in the signal member is in the lowered position, is entirely beneath the path taken by the boat during loading and unloading, thereby avoiding the risk of damage to the device.

The bracket, which may be of various designs, is desirably mounted near the rear of the trailer, and preferably on the rear lateral frame member, so that the bracket and lower part of the signal device will be immersed when the rear of the trailer enters the water. Preferably, the bracket includes a mounting plate and parallel arms to which the signal member is attached.

The signal member is comprised of a staff, for example an aluminum or fiberglass rod or tube, preferably with a flag or other indicator at its upper end to improve visibility. Visability may also be improved by using a staff of a bright or florescent color. A flotation element having a total density less than water, and a weight greater than the weight of the staff is attached to the lower end of the staff. The member is pivotally attached to the bracket between the staff and flotation device.

Thus, when the guide device is out of the water, the weight of the flotation element will pivot the signal member to the upright position, since the weight of the segment of the member below the pivot position is greater that the weight of the segment above the pivot position. However, when the flotation element is immersed in water, the element will tend to rise, thereby lowering the attached staff.

Preferably, the flotation element is rearwardly offset at a small angle, e.g., about 5–30 from the longitudinal axis of the staff when the signal member is pivotally attached to the bracket. As a result, the flotation element will move upwardly on the rear side of the bracket when immersed, lowering the staff toward the front of the trailer, where it will be protected inside the trailer frame.

In order to avoid contact with the boat, the bracket is mounted at a level below the upper surfaces of the boat skids and rollers. The bracket desirably includes a horizontal arm attached at its rear end to the trailer's rear lateral frame member and a forward distal end, and a signal member attachment element attached to the distal end of the horizontal arm. The signal member attachment element may be U-shaped element with a pair of spaced, downwardly extending arms having openings or other means at their distal ends to receive a pivot pin or rod upon which the signal member is mounted.

When a signal member having a rearwardly offset flotation element is pivotally mounted onto a bracket of this configuration, the flotation element will move rearwardly and upwardly to a protected position beneath the frame attachment element when the rear of the trailer is immersed, thereby lowering the signal staff to a generally horizontal position at a horizontal level beneath the level of the upper surfaces of the boat skids and rollers.

Accordingly, one aspect of the present invention is to provide a boat trailer guide that is automatically raised when the unloaded trailer is out of the water, and automatically lowered when the guide is immersed in the water so that the guide will not be damaged during loading and unloading of a boat.

These and other aspects of the present invention will become apparent to those skilled in the art after a reading of the following description of the preferred embodiment.

DETAILED DESCRIPTION OF THE INVENTION

In the following description, terms such as horizontal, upright, vertical, above, below, beneath, and the like, are used solely for the purpose of clarity in illustrating the invention, and should not be taken as words of limitation. The drawings are for the purpose of illustrating the invention and are not intended to be to scale.

Figure 1:
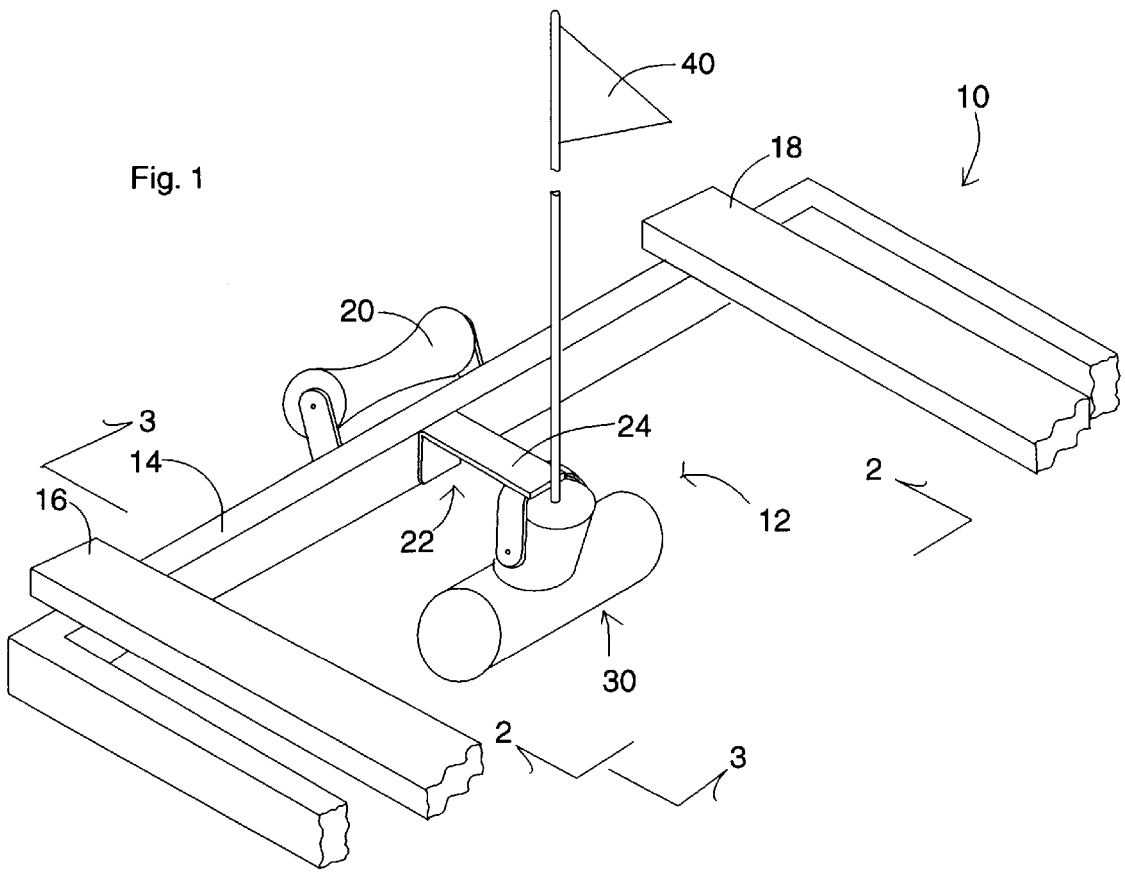
FIG. 1 is a perspective view of the rear section of a boat trailer with the guide device mounted thereon, and in the upright position.

FIG. 1 illustrates a boat trailer, generally 10, having the guide device, generally 12, attached to the rear lateral frame member 14 of trailer 10. Trailer 10 further includes skids 16 and 18, and grooved roller 20.

Guide device 12 is comprised of mounting bracket 22 attached to the forward side of frame member 14 in a known manner, such as with bolts or by welding. Bracket 22 includes a horizontal arm 24 having a rear end attached to frame member 14 and a distal forward end. Downwardly extending support arms 26 and 28 are attached to the distal end of horizontal arm 24 to support a flotation element 30 beneath a pivot point on horizontal pivot pin 32. Element 30 is comprised on a horizontal, cylindrical float segment 34 integrally joined to connecting element 36, through which pin 32 is inserted.

Element 30 can be formed of various materials. For example, all of element 30 can be formed of molded plastic foam, or a hollow blow-molded plastic. Alternatively, segments 34 and 36 can be of different materials. Element 30 can also be of shapes other than as illustrated. Importantly, however, element 30, or at least segment 34 thereof, is lighter than water, so that segment 34 will pivot upwardly when immersed in water.

Staff 38 is attached at its lower end to element 30. Flag 40 is attached to the distal end of staff 36. It should be noted that the element 30 is offset to the rear of the longitudinal axis of staff 36, so that element 30 will pivot toward the rear of trailer 10 and assume a position beneath horizontal arm when immersed, while staff 36 will pivot toward the front of trailer 10, assuming a horizontal position. Preferably, flotation element 30 is offset at an angle of from about 5° to about 30° to the rear of the longitudinal axis of staff 38.

Movement past the horizontal position can be prevented by constructing guide device 12 such that element 30 engages the underside of horizontal arm when staff 38 reaches the horizontal position, thereby preventing further rotation. Similarly, guide 12 can be designed such that staff 38 engages the front edge of horizontal arm 24 when staff 38 reaches the vertical position, holding element 30 toward the rear of vertical to effect the desired direction of rotation when guide device 12 is again immersed in water.

Figure 2:
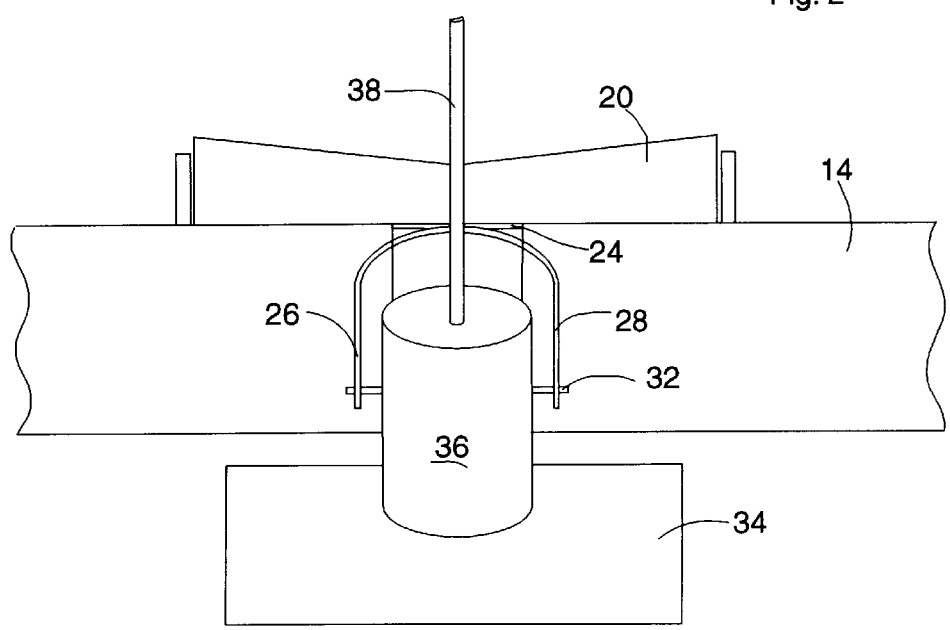
FIG. 2 is sectional plan view of the device as seen along line 2—2 of FIG. 1.
Figure 3:
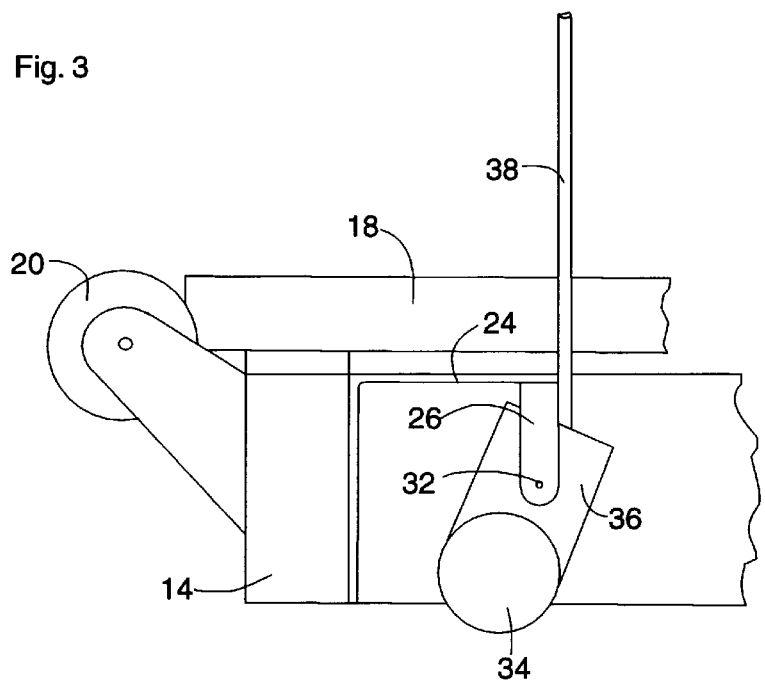
FIG. 3 is a sectional side view of the device as seen along line 3—3 of FIG. 1.
Figure 4:
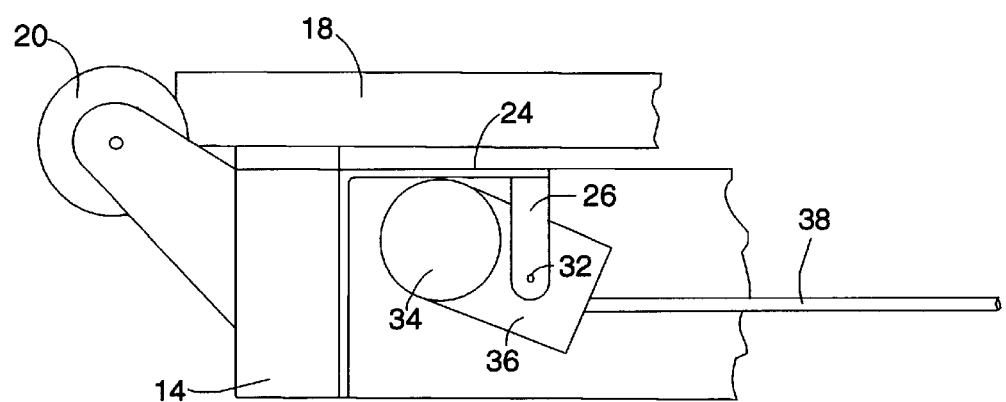
FIG. 4 is a sectional side view of the device with the signal member in the lowered position.

When trailer 10 is out of the water, flotation element 30, being heavier that staff 38 holds staff 38 in the upright, generally vertical, position shown in FIGS. 1–3. Therefore, staff 38 and visual aid 40 are visible to the driver of the towing vehicle as trailer 10 is backed into the water. Upon immersion of the rear to trailer 10 in the water, element 30 pivots upwardly and rearwardly, moving staff 36 to the horizontal position shown in FIG. 4.

When in the horizontal position, staff 38, as well as all other components of guide 12, are below the horizontal level of the upper surfaces of skids 16 and 18, and roller 20. Thus, guide device 12 is not contacted by a boat being loaded onto, or unloaded from, trailer 10. As a result, a visual guide is automatically provided to the driver when needed, and automatically moved out of harms way when no longer of use.

Certain modifications and improvements will occur to those skilled in the art upon a reading of the foregoing description. It should be understood that all such modifications and improvements have been deleted herein for the sake of conciseness and readability but are properly within the scope of the follow claims.

What is claimed is:

1. A boat trailer guide device for use on a boat trailer, the guide device having a raised, visible position when the device is out of the water, and a lowered position when the device is immersed in the water comprising:

a) a mounting bracket for mounting said device on the boat trailer; and b) a signal member pivotal between substantially vertical raised and substantially horizontal lowered positions mounted on said mounting bracket, said signal member including an elongated staff with an inner end and a distal end, and a flotation element attached to the inner end of said staff, said flotation element having a density less than water, and a weight greater than said staff, said flotation device being pivotal between a lowered position when not immersed in water and a raised position when immersed in water, said staff being in the raised position when said flotation element is in the lowered position, and in the lowered position when said flotation element is in the raised position.

2. The guide device of claim 1, wherein said staff includes a visual aid at said distal end.

3. The guide device of claim 1, wherein said bracket includes a horizontal, forward projecting arm, said flotation element being adapted to pivot upwardly beneath said arm.

4. The guide device of claim 1, wherein said flotation element is offset from the longitudinal axis of said staff.

5. The guide device of claim 4, wherein said flotation element is offset at an angle of from about 5° to about 30°.

6. The guide device of claim 1, wherein said bracket includes a pair of spaced downwardly extending arms and a horizontal pivot pin extending between said arms, said signal member being mounted on said pivot pin.

7. The guide device of claim 1, wherein said flotation element includes a first horizontal segment and a second connecting segment extending outwardly from said first segment, said flotation element being pivotally joined to said bracket at said second segment.

8. The guide device of claim 7, wherein said first segment is cylindrical.

9. The guide device of claim 1, wherein said mounting bracket includes a horizontal arm having a lower surface, said flotation element engaging said lower surface when said signal member is pivoted to the lowered position.

10. The guide device of claim 1, wherein said mounting bracket includes a horizontal arm having a forward end, said flotation element engaging said forward end when said signal member is pivoted to the raised position.

11. A combination boat trailer and guide device comprising:
   a) a boat trailer having a frame; and
   b) a guide device attached to said frame, said guide device including a mounting bracket, and a signal member pivotal on said mounting bracket between generally vertical raised and generally horizontal lowered positions, said signal member including an elongated staff with an inner end and a distal end, and a flotation element attached to the inner end of said staff, said flotation element being lighter than water, and having a weight greater than the weight of said staff; said flotation device being pivotal between a lowered position when not immersed in water and a raised position when immersed in water said staff being in the raised position when said flotation element is in the lowered position, and in the lowered position when said flotation element is in the raised position.

12. The combination boat trailer and guide device of claim 11, wherein said frame includes a rear lateral frame member, and said mounting bracket is attached to said frame member.

13. The combination boat trailer and guide device of claim 11, wherein said boat trailer further includes skids and a roller with upper surfaces, said guide device being positioned entirely below the upper surfaces of said skids and roller when said signal member is in the lowered position.

14. The combination boat trailer and guide device of claim 11, wherein said staff includes a visual aid at said distal end.

15. The combination boat trailer and guide device of claim 11, wherein said bracket includes a horizontal, forward projecting arm, said flotation element being adapted to pivot upwardly beneath said arm when said flotation element is immersed in water.

16. The combination boat trailer and guide device of claim 11, wherein said flotation element is offset from the longitudinal axis of said staff when said staff is in the raised position.

17. The combination boat trailer and guide device of claim 11, wherein said trailer includes a lateral frame member, said bracket being mounted on said lateral frame member, and including a pair of spaced downwardly extending arms and a horizontal pivot pin extending between said arms parallel to said lateral frame member, said signal member being mounted on said pivot pin.

18. The combination boat trailer and guide device of claim 11, wherein said flotation element includes a first horizontal segment and a second segment extending outwardly from said first segment, said flotation element being pivotal on said mounting bracket at said second segment.

19. A boat trailer guide device comprising:
   a) a mounting bracket;
   b) an elongated signal staff with an inner end and a distal end;
   c) a flotation element having a density less than water, and a weight greater than said staff; and
   d) a connecting element joining the inner end of said staff and said flotation element, said connecting element being pivotally attached to said mounting bracket, whereby said staff is pivotal to a raised generally vertical position when said flotation element is out of the water and to a lowered generally horizontal position when said flotation element is immersed in water.

* * * * *